Dec. 13, 1927.
A. C. HOPKINS
1,652,406
LIFTING JACK
Filed April 21, 1926
2 Sheets-Sheet 1
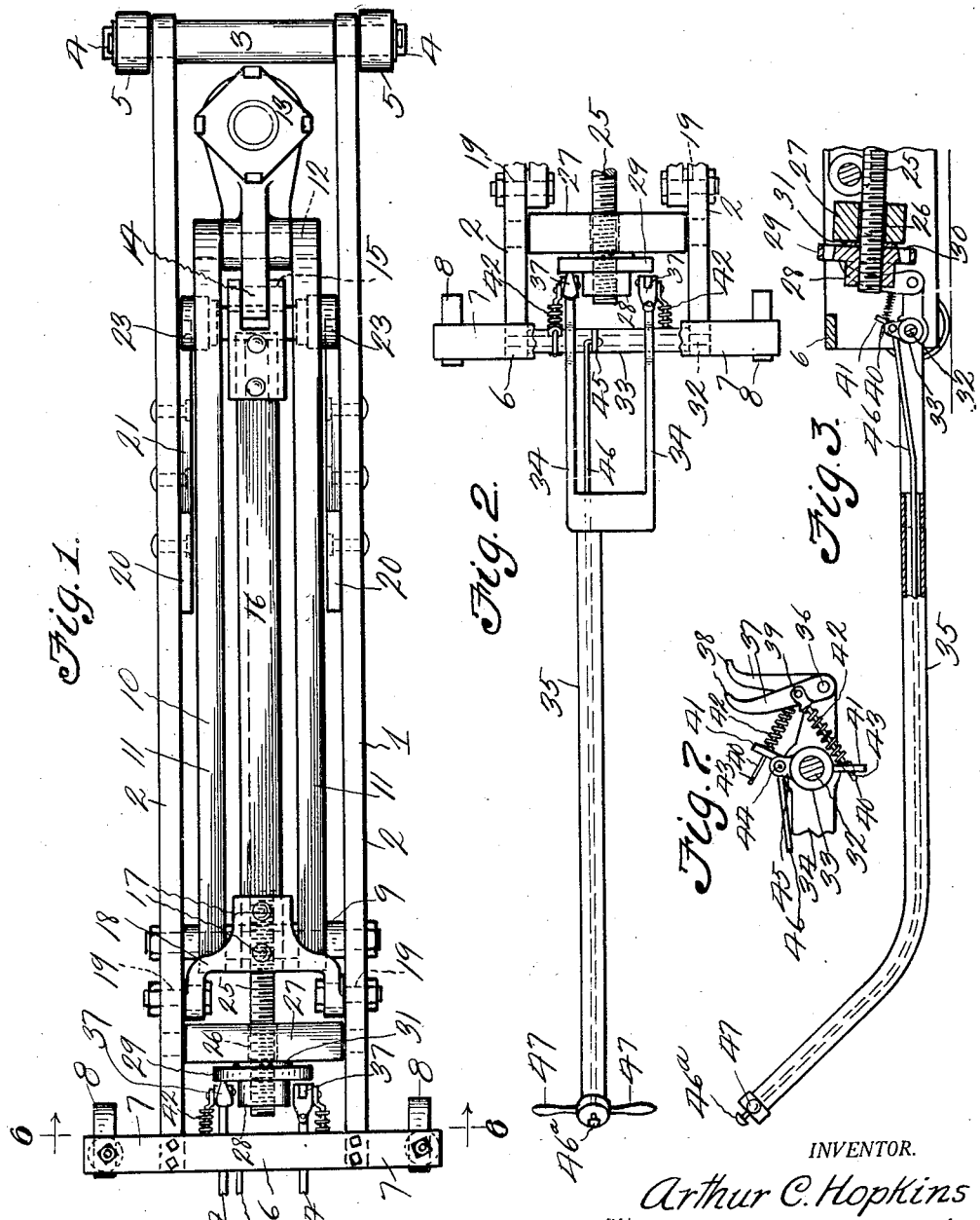
INVENTOR.
Arthur C. Hopkins
BY George J. Oltsch
ATTORNEY.

Dec. 13, 1927.
A. C. HOPKINS
LIFTING JACK
Filed April 21, 1926    2 Sheets-Sheet 2
1,652,406
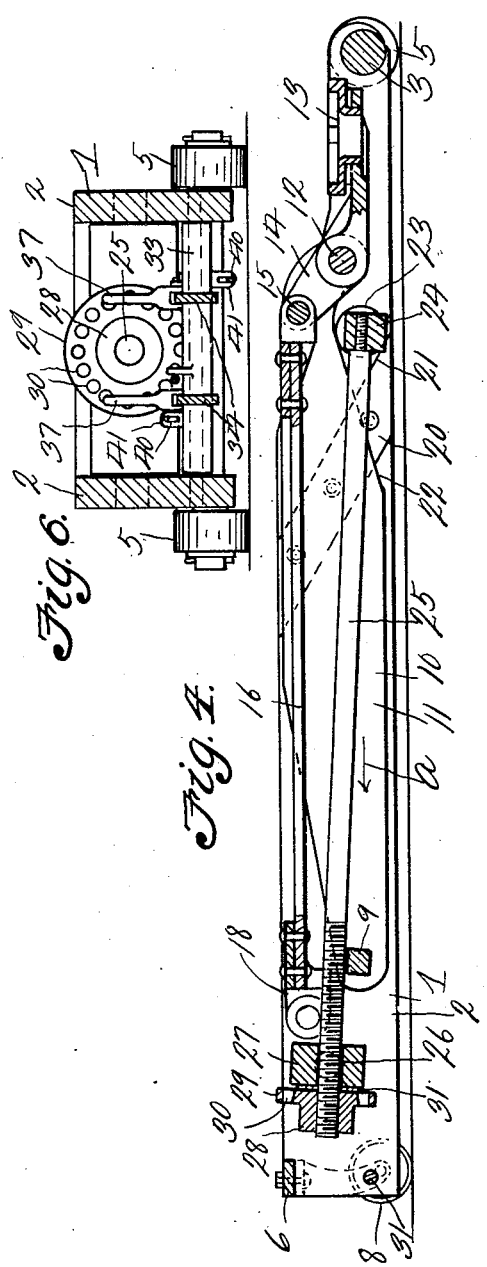
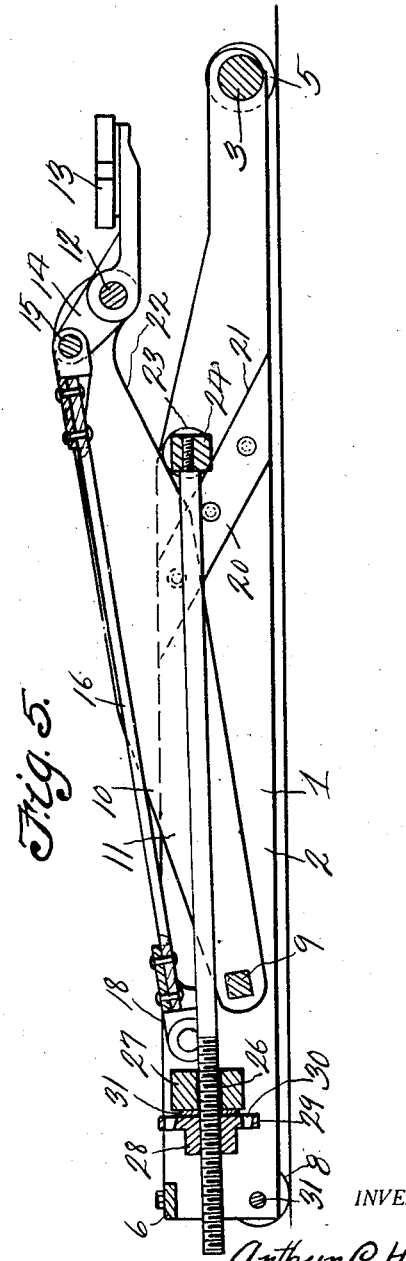
INVENTOR.
Arthur C. Hopkins.
BY George J. Koch
ATTORNEY.

Patented Dec. 13, 1927.

1,652,406

UNITED STATES PATENT OFFICE.

ARTHUR C. HOPKINS, OF NILES, MICHIGAN, ASSIGNOR TO NATIONAL STANDARD COMPANY, OF NILES, MICHIGAN, A CORPORATION OF MICHIGAN.

LIFTING JACK.

Application filed April 21, 1926. Serial No. 103,475.

The invention relates to lifting jacks, and has for its object to provide a device of this character particularly adapted for use in connection with the rear axles of heavy motor busses, and which axles, upon deflation of the tires, are relatively close to the ground, and the axles a considerable distance from the rear end of the body of the bus, and which conditions require a lifting jack which is relatively low whereby its axle engaging member is close to the ground so it can be moved under the axle and the jack as a whole relatively long whereby its rear end will extend to a position adjacent the rear end of the body of the bus so that the jack can be easily manipulated.

A further object is to provide a lifting jack comprising a fixed frame, in which is mounted a pivoted frame, the free end of which extends forwardly and terminates in an axle engaging member, an axially movable shaft carried by the fixed frame and operable from adjacent the rear end of the jack, the forward end of the jack being provided with means cooperating with the fixed frame and the pivoted frame whereby upon axial movement of the operating shaft, the free end of the pivoted frame may be raised or lowered.

A further object is to provide the free end of the pivoted frame with upwardly and forwardly inclined surfaces and the fixed frame with downwardly and forwardly inclined surfaces, and the axially movable operating shaft with rollers cooperating with said inclined surfaces whereby upon axial movement of the operating shaft the free end of the pivoted frame may be raised or lowered according to the direction of movement of the operating shaft.

A further object is to hingedly connect the axle engaging member to the free end of the pivoted frame and in a horizontal position, and to provide means whereby upon an upward and downward movement of the free end of the pivoted frame the axle engaging member is maintained in a horizontal position.

A further object is to provide the axle engaging member with an upward and rearwardly extending arm, to the rear end of which is pivotally connected a link, which link has its other end pivotally connected to the fixed frame, and which link forms means whereby upon an upward or downward movement of the free end of the pivoted frame, the axle engaging member is maintained in a horizontal position.

A further object is to provide the inner faces of the side bars of the fixed frame with rearwardly and upwardly inclined tracks, and the side bars of the pivoted frame with upwardly and forwardly extending tracks adjacent the tracks of the fixed frame, an axially movable and pivotally mounted operating shaft, a transversely disposed member carried by the forward end of the operating shaft and rollers carried by the ends of the transversely disposed member and engaging the adjacent tracks of the fixed frame and the pivoted frame, and forming means whereby upon axial movement of the operating shaft said rollers will force the free end of the pivoted frame upwardly or allow the same to lower.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a top plan view of the jack.

Figure 2 is a top plan view of a portion of the rear end of the jack, showing the operating handle and mechanism.

Figure 3 is a vertical longitudinal sectional view through the rear end of the jack.

Figure 4 is a vertical longitudinal sectional view through the jack.

Figure 5 is a vertical longitudinal sectional view through the jack, showing the axle engaging member partially raised.

Figure 6 is a vertical transverse sectional view through the rear end of the jack taken on line 6—6 of Figure 1.

Figure 7 is a detail view of the operating handle carried pawls.

Referring to the drawings, the numeral 1 designates the fixed frame which is horizontally disposed and is relatively low and elongated, and which frame comprises spaced bars 2 in parallel relation, the forward ends of which are connected together by the shaft 3. The ends 4 of the shaft 3 extend beyond the outer sides of the bars 2 and provided with rollers 5. The rear ends of the bars 2 are connected together by a transversely disposed bar 6, the ends 7 of which extend beyond the outer sides of the bars 2 and are provided with pivoted caster wheels 8, which caster wheels allow lateral movement of the rear end of the jack in handling the same and positioning the same for an axle raising operation. Pivotally mounted on a transversely disposed shaft 9, which connects the bars 2 adjacent their rear ends, is a pivoted frame 10, and which frame comprises parallel bars 11, which extend forwardly adjacent but spaced from the inner faces of the bars 2 of the fixed frame, and the forward ends of the bars 11 are connected together by means of a shaft 12. It will be seen the frame 10 may move upwardly and downwardly in relation to the forward end of the fixed frame 1 on the shaft 9 as a pivotal point and during a jacking operation the free end of the pivoted frame 10 moves upwardly or downwardly.

Pivotally mounted on the shaft 12 and extending forwardly is an axle engaging arm 13, which arm is maintained in a horizontal position at all times during a jacking operation. The axle engaging arm 13 is provided with a rearwardly and upwardly extending arm 14, to which is pivotally connected at 15 a rearwardly extending link 16, the rear end of which is connected at 17 to the yoke 18, which yoke is pivotally connected at 19 to the side bars 2 of the fixed frame 1. It will be seen that when the forward end of the pivoted frame 10 moves upwardly on the shaft 9 as a pivotal point, and as the pivotal points 19 are above the pivotal point of the pivoted frame, the link 16 will cooperate with the arm 14 whereby the axle engaging member 13 will be maintained in a horizontal position at all times, and at the same time by this particular construction the axle engaging member 13 may assume a position relatively close to the ground so that it may be placed under the axle when relatively close to the ground, which is particularly advantageous in heavy motor bus construction when a tire is deflated, and at which time the axle housing is relatively close to the ground.

Secured to the inner faces of the side bars 2 of the fixed frame are plates 20, which plates are disposed between the side bars 2 and the side bars 11 of the pivoted frame 10. Plates 20 incline downwardly and forwardly and are provided with downwardly and forwardly inclined surfaces 21, adjacent the free end of the pivoted frame 10. The forward ends of the side bars 11 of the pivoted frame 10 are provided with upwardly and forwardly extending inclined surfaces 22 adjacent the inclined surfaces 21 of the plates 20. Interposed between and adjacent the inclined surfaces 21 and 22 are rollers 23, which rollers are rotatably mounted on the ends of a transversely disposed head 24, and which head is moved forwardly and rearwardly by an operating rod 25, which moves axially, and it will be seen when the operating rod 25 is moved in the direction of the arrow $a$, Figure 4, the rollers 23 will cooperate with the inclined surfaces 21 and 22, and will force the free end of the pivoted frame 10 upwardly, thereby raising the axle engaging member 13 and which axle engaging member will be maintained in a horizontal position by the link 16 which is connected to the arm 14. Operating rod 25 extends rearwardly and is slidably mounted at 26 in a transversely disposed rock bar 27, and is threaded through a rotatable member 28, which is provided with a disc 29 having a plurality of circumferentially arranged apertures 30 and a bearing disc 31 is interposed between the rotatable member 28 and the rock bar 27, and is preferably formed from hard metal. It will be seen when the rotatable member 28 is rotated in one direction the operating rod 25 will be moved in the direction of the arrow $a$, thereby moving the rollers 23 rearwardly for raising the free end of the pivoted frame 10, and when rotated in the other direction the weight of the frame 10 and the load carried thereby, in cooperation with the inclined surfaces 21 and 22 will force the rollers 23 forwardly, thereby lowering the forward end of the pivoted frame and the axle engaging member 13.

Referring to Figures 2 and 7, wherein mechanism is shown for rotating the member 28, this mechanism is substantially the same as that shown in applicant's prior Patent No. 1,559,099, issued October 27, 1925, and which patent shows a member equivalent to the member 28, and which comprises a transversely disposed shaft 32 connecting the rear ends of the side bars 2 together, and on which shaft is rockably mounted a sleeve 33, and which sleeve has rockably mounted thereon the arms 34 carried by the hollow handle member 35. The arms 34 extend forwardly of the sleeve 33 and have pivotally connected thereto at 36 upwardly extending pawls 37, the noses 38 of which are adapted to be received in the apertures 30 of the disc 29 for rotating said disc and member 28 in either direction according to which pawl 37 is in operative position, and during an oscillation of the handle member 35. Pawls 37 have pivotally connected thereto at 39 rods 40, which rods are slidably mounted in apertured ears 41 carried by the sleeve 33 and carried by the upper and lower sides of the sleeve, whereby upon rotation of the sleeve in one direction one of the pawls will be moved into cooperative engagement with the apertured disc 29 and the other pawl moved out of cooperative engagement, and which operation is accomplished by one of the ears 41 compressing one of the springs 42 interposed between the ears and the pawls and the other ear cooperating with a pin 43 carried by the outer ends of the rods 40, therefore it will be seen that by rocking the sleeve 33, either pawl 37 can be forced into cooperative engagement with the apertured disc 29, and at opposite sides of the axis of the disc, whereby upon an oscillation of the handle member 35 rotation can be imparted to the member 28 in either direction during a hoisting or lowering operation. Pivotally connected at 44 to an upwardly extending ear 45 carried by the sleeve 33 is a rearwardly extending flexible control rod 46, which control rod extends through the hollow handle 35 and terminates in a member 46ª adjacent the handle members 47 where it can be easily controlled by the operator during a hoisting or lowering operation.

From the above it will be seen a lifting jack is provided, which is particularly adapted for use in connection with relatively heavy motor busses wherein the axle housing is particularly close to the ground, especially when a tire is deflated, and the jack is relatively long whereby its rear end will extend rearwardly from an axle a substantial distance so the same may be handled and manipulated without interference from the overhang of the motor bus body. It will also be seen that a relatively powerful leverage is obtained by the rollers cooperating with the cam surfaces, and the working parts are reduced to a minimum.

The invention having been set forth what is claimed as new and useful is:—

1. The combination with a lifting jack comprising a fixed frame, a pivoted frame carried by the fixed frame, of means for forcing the free end of the pivoted frame upwardly, said means comprising an axially and pivotally movable operating rod carried by the fixed frame, and means carried by the operating rod and cooperating with opposed cam surfaces carried by the free end of the pivoted frame and the fixed frame.

2. A lifting jack comprising a fixed frame having a rearwardly and upwardly inclined cam surface, a pivoted frame having an upwardly and forwardly inclined surface adjacent the first mentioned inclined surface, and a rearwardly and forwardly movable member carrier by the fixed frame and cooperating with the inclined surfaces and forming means whereby the free end of the pivoted frame may be forced upwardly or be allowed to move downwardly, said rearwardly and forwardly movable member being pivoted adjacent one of its ends and swingable in a vertical plane.

3. A vehicle jack comprising an elongated fixed frame having side bars, a pivoted frame within the fixed frame and having side bars, cam surfaces carried by the inner sides of the side bars of the fixed frame, opposed cam surfaces carried by the side bars of the pivoted frame, an axle engaging member carried by the free end of the pivoted frame, a transversely disposed member, rollers carried by the ends of the transversely disposed member and disposed between and in engagement with the cam surfaces of the fixed frame and the pivoted frame, a pivoted rearwardly extending axially and vertically swingable operating rod connected to the transversely disposed member, and means cooperating with the operating rod whereby it may be axially moved.

In testimony whereof I affix my signature.

ARTHUR C. HOPKINS.